US012565948B2

(12) United States Patent
Brock et al.

(10) Patent No.: US 12,565,948 B2
(45) Date of Patent: Mar. 3, 2026

(54) CONNECTION ARRANGEMENT DEVICE AND METHOD FOR FLUID LINE

(71) Applicant: TI GROUP AUTOMOTIVE SYSTEMS, LLC, Auburn Hills, MI (US)

(72) Inventors: Jonathan Brock, Bloomfield Township, MI (US); Benjamin Allen Sprygada, Battle Creek, MI (US); Matthew Stieber, Grosse Pointe, MI (US)

(73) Assignee: TI GROUP AUTOMOTIVE SYSTEMS, Auburn Hills, MI (US)

( * ) Notice: Subject to any disclaimer, the term of this patent is extended or adjusted under 35 U.S.C. 154(b) by 0 days.

(21) Appl. No.: 18/873,127

(22) PCT Filed: Jul. 27, 2022

(86) PCT No.: PCT/US2022/038503
§ 371 (c)(1),
(2) Date: Dec. 9, 2024

(87) PCT Pub. No.: WO2024/025524
PCT Pub. Date: Feb. 1, 2024

(65) Prior Publication Data
US 2025/0314336 A1 Oct. 9, 2025

(51) Int. Cl.
*F16L 21/00* (2006.01)
*F16L 21/08* (2006.01)
*B60R 16/08* (2006.01)

(52) U.S. Cl.
CPC ............. *F16L 21/002* (2013.01); *F16L 21/08* (2013.01); *B60R 16/08* (2013.01)

(58) Field of Classification Search
CPC ....... F16L 23/032; F16L 23/024; F16L 23/02; F16L 43/02; F16L 41/088; F16L 41/08;
(Continued)

(56) References Cited

U.S. PATENT DOCUMENTS

| | | | |
|---|---|---|---|
| 2015/0076810 A1* | 3/2015 | Tran ...................... | B60T 17/043 285/33 |
| 2017/0074440 A1 | 3/2017 | Carremm et al. | |
| 2021/0199219 A9 | 7/2021 | Zwillus et al. | |

FOREIGN PATENT DOCUMENTS

| | | | |
|---|---|---|---|
| DE | 102011053208 A1 | 3/2013 | |
| JP | 6477643 B2 * | 3/2019 | ............ F16L 37/008 |

OTHER PUBLICATIONS

JP 6477643 translation (Year: 2019).*
International Search Report and Written Opinion of PCT/US2022/038503, mailed Dec. 2, 2022.

* cited by examiner

*Primary Examiner* — Aaron M Dunwoody
(74) *Attorney, Agent, or Firm* — DICKINSON WRIGHT PLLC

(57) ABSTRACT

A connection arrangement device for making a secure connection with at least one tube in a fluid line includes at least one adapter body having a passage bore forming at least one fluid channel with at least one outlet and a receptacle, a mating block formed with at least one longitudinal channel receiving the at least one adapter body, and the at least one adapter body includes a retention feature formed in the receptacle and coupled to the mating block such that the at least one adapter body is securely retained in the mating block. In particular, the retention feature of the adapter body is formed with an annular lip at an end portion of the receptacle to be coupled with the mating block.

14 Claims, 4 Drawing Sheets

(58) Field of Classification Search
CPC ....... F16L 41/12; F16L 41/001; F16L 41/086;
F16L 37/008
See application file for complete search history.

CONNECTION ARRANGEMENT DEVICE AND METHOD FOR FLUID LINE

CROSS-REFERENCE TO RELATED APPLICATIONS

This application is a 35 U.S.C. § 371 national phase of PCT International Application No. PCT/US2022/038503, filed Jul. 27, 2022, the contents of which are incorporated herein by reference in its entirety.

FIELD

The present disclosure relates to a connection arrangement in a fluid line assembly. In particular, the present disclosure relates to the connection arrangement having an adapter with a mating block for making a secure connection in a vehicle.

BACKGROUND

The statements in this section merely provide background information related to the present disclosure and may not constitute prior art.

Connection arrangements are generally used in a fluid line assembly in motor vehicles including electric vehicles (EVs) and hybrid vehicles. In particular, the connection arrangements are used in air conditioning systems, cooling systems (e.g., coolant circuits), valve units, and pump units. The design has to be particularly compact and lightweight in a limited space, and also the pipe or tube connections in the air conditioning systems may be comprised of metallic, rubber, and plastic materials. In addition, the pipe or tubes are attached via adapters, which are provided with sealing elements. Accordingly, it is necessary to connect the adapters firmly and with durable sealing both to the pipe and detachably to a further pipe or to another component in the air conditioning system. However, in addition to high pressures and temperatures, vibrations occur and are transmitted within the components of the air conditioning system. The connection arrangements used in the air conditioning system, therefore, have to be constructed in such a way that a durable connection is provided in spite of vibrations, high pressures, high temperature, and corrosive media, and that fluid leakage cannot occur.

Generally, it is important that the fluid line system such as the air conditioning system in the vehicle is constructed to be lightweight and also durable in a limited space. However, we have discovered that the number of fastening means fixing together the components of the fluid line system are limited, and also it is difficult to configure the adapters for providing durable sealing of the connection arrangements for making a secure connection in the fluid line system. To effectively arrange the sealed and secured fluid line in the vehicle, a number of devices and methods for the connection arrangements are continuously developed and used in various fluid line systems.

SUMMARY

The present disclosure relates to a connection arrangement device for making a secure connection (i.e., a fluid tight connection) with at least one tube in a fluid line. The connection arrangement device of the present disclosure makes it possible to produce a stable and durable connection with a light weight in a fluid line system such as an air conditioning system in a vehicle. According to one aspect of the present disclosure, the connection arrangement device includes at least one adapter body having a passage bore forming at least one fluid channel with at least one outlet and an receptacle, and a mating block having at least one longitudinal channel receiving the at least one adapter body. Further, the receptacle of the adapter body is formed with a retention feature coupled to the mating block such that the at least one adapter body is securely retained in the mating block.

According to a further aspect of the present disclosure, the retention feature of the adapter body is formed with an annular lip at an end portion of the receptacle such that the annular lip is coupled with a second surface of the mating block. The annular lip is formed with cut-outs to provide radial flexibility to the end portion of the receptacle to be securely held into the mating block. The annular lip is operable between a locked position and an unlocked position. In the unlocked position, the annular lip has a first diameter that is sized to pass through the longitudinal channel of the mating block, and in the locked position, the annular lip has a second diameter that is greater than a diameter of the longitudinal channel of the mating block. Further, the annular lip has a tip end radially extends from an outer surface of the receptacle such that the tip end is formed with a L-shape and configured to couple with the mating block. The annular lip of the receptacle is formed with a pocket around the tube used for a bonding between the tube and the adapter body when the tube is inserted into the receptacle of the adapter body.

According to a further aspect of the present disclosure, the adapter body includes an adapter bead outwardly and radially formed around a first end of the outlet such that the adapter bead is coupled with a first surface of the mating block. The adapter body includes the outlet and the receptacle formed in a straight-flow direction in the fluid line.

According to a further aspect of the present disclosure, the longitudinal channel of the mating block has a first dimension and an adapter bead of the adapter body has a second dimension, which is greater than the first dimension such that the adapter body is securely retained in the mating block. Further, a sealing ring is placed around the outlet of the adapter body and configured for sealing in the fluid line when the outlet is connected with the tube or attached to a fluid line system component.

According to a further aspect of the present disclosure, at least one tube or hose is inserted into the receptacle of the adapter body and connected to the adapter body in a firmly bonded manner.

According to a further aspect of the present disclosure, the adapter body is formed of a plastic material and the mating block is formed of a metallic material or a polymeric material.

According to another aspect of the present disclosure, a method of a connection arrangement with at least one tube for making a secure connection in a fluid line, the method comprises of the steps of providing at least one adapter body having a receptacle, inserting an end of the tube into the receptacle and connecting the inserted tube with the adapter body in a firmly bonded manner, providing a mating block having at least one longitudinal channel, and coupling the adapter body with the inserted tube to the at least one longitudinal channel of the mating block such that the adapter body is securely engaged with the mating block.

According to a further aspect of the present disclosure, the method further includes the step of installing a sealing ring in an outlet formed in the adapter body by an interference-fit to connect with another tube. In addition, the method includes the step of mounting the mating block engaged with adapter body in the fluid line by a fastening element via a through hole of the mating block.

Further details and benefits will become apparent from the following detailed description of the appended drawings. The drawings are provided herewith purely for illustrative purposes and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
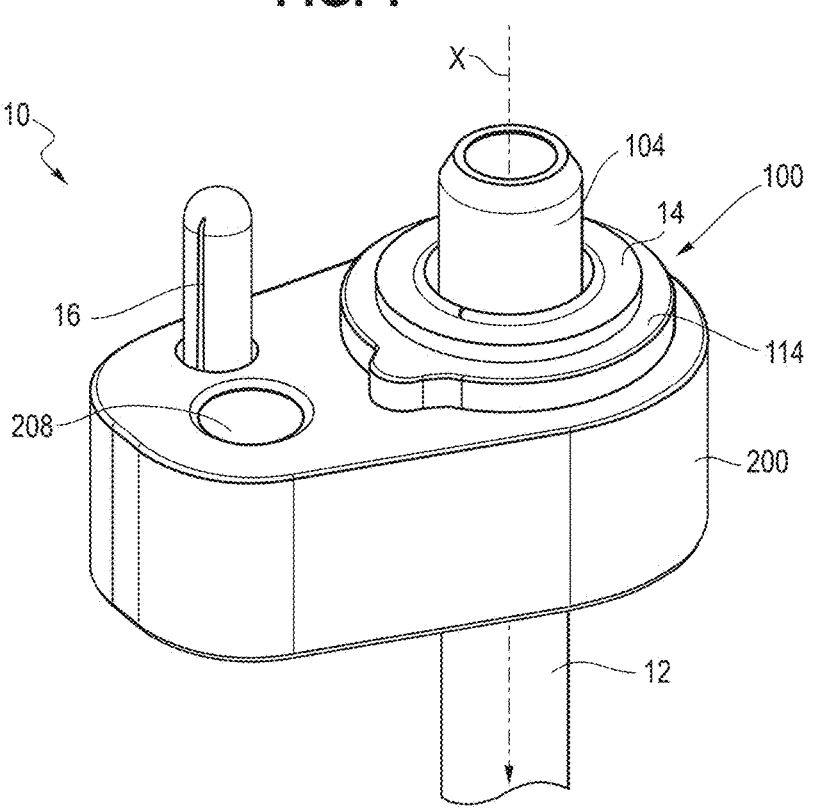
FIG. 1 shows a top perspective view of a connection arrangement device including an adapter body and a mating block in accordance with an embodiment of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the drawings, corresponding reference numerals indicate like or corresponding parts and features.

A connection arrangement device of the present disclosure is illustrated in connection with a fluid line system such as an air conditioning system or a cooling system, etc. in motor vehicles including electric vehicles (EVs) and hybrid vehicles. As an example, the connection arrangement device of the present disclosure is used in an air conditioning system having a compressor, a condenser, heat exchangers, evaporators, and also midline connections. In particular, the connection arrangement device is provided for the air conditioning system having a low weight, and having a durable and tight connection of the components of the air conditioning system in the vehicle (i.e., inhibiting leak in the connection of the components). However, the connection arrangement device of the present disclosure is not limited and is also used in other fluid line systems such as cooling systems (e.g., coolant circuits), valve units, pump units, etc.

Figure 1A:
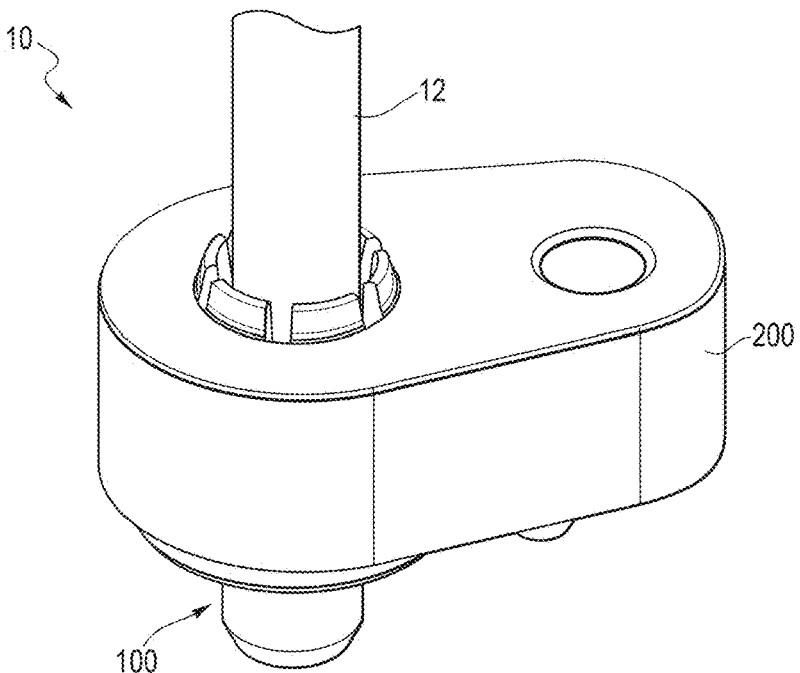
FIG. 1A shows a bottom perspective view of the connection arrangement device of FIG. 1.

FIGS. 1 and 1A show an embodiment of the connection arrangement device 10 having at least one adapter body 100 and a mating block 200 coupled with the adapter body 100. Generally, the connection arrangement device 10 is fixed to a fluid line system such as an air conditioning system (not shown) by a fastening element for a fluid line such as a refrigerant in an automotive vehicle. As shown in FIGS. 1 and 1A, the adapter body 100 has a passage bore 102 as a fluid channel formed in a straight shape along a longitudinal axis X of the adapter body 100 (see FIG. 4). Further, the adapter body 100 includes an outlet 104 formed at an end of the adapter body 100 and a receptacle 106 formed at the other end of the adapter body 100 along the longitudinal axis X such that the outlet 104 communicates with the receptacle 106 through the fluid channel. The outlet 104 and the receptacle 106 are each connected with a tube or a hose 12 for making a secure connection in the fluid line system. For example, the receptacle is connected to the tube or hose 12 by a firmly bonded matter such as a laser welding or a spin welding, and the outlet 104 is generally connected to one of the system components and fixed by a fastening member (e.g., a screw) in a through hole 208.

Figure 2:
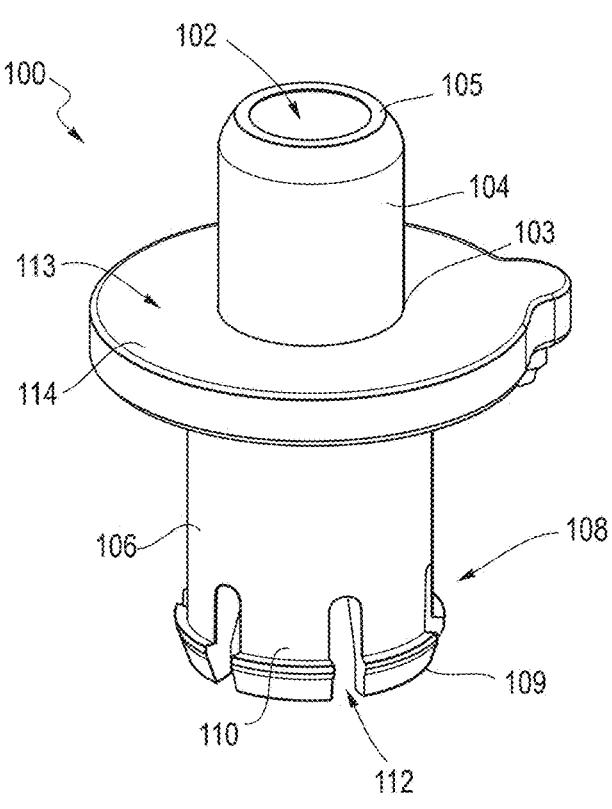
FIG. 2 shows a top perspective view of the adapter body of the connection arrangement device of FIG. 1.
Figure 2A:
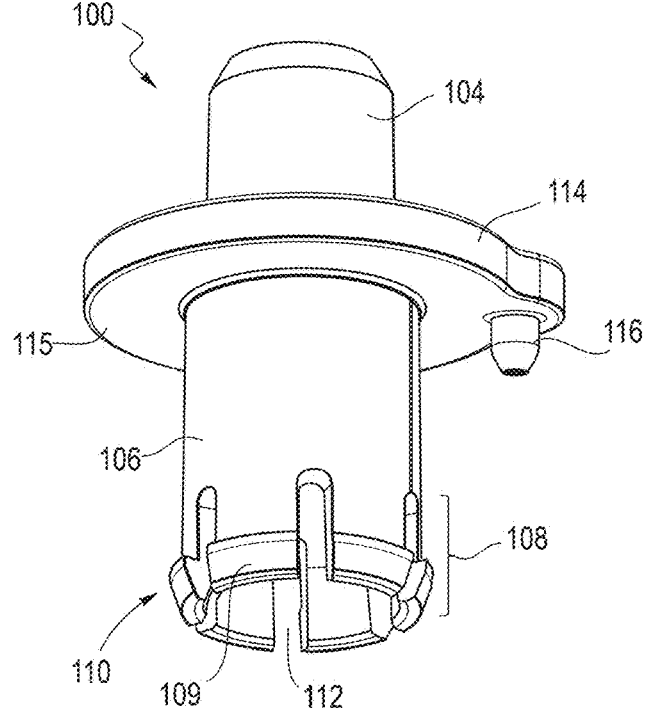
FIG. 2A shows a bottom perspective view of the adapter body of FIG. 2.

FIGS. 2 and 2A show the adapter body 100 having the outlet 104 and the receptacle 106. In FIGS. 2 and 2A, the receptacle 106 of the adapter body 100 extends along the passage bore 102 to receive a tube 12 such that the tube 12 is inserted into the receptacle 106, and is securely connected to the adapter body 100. As shown in FIGS. 2 and 2A, the receptacle 106 is formed with an annular lip 110 having a retention feature, which is utilized to hold the adapter body 100 into the mating block 200. The annular lip 110 is formed with multiple cut-outs 112 around the circumference of the annular lip at an end portion 108 of the receptacle 106 to provide radial flexibility, and also the annular lip 110 has a tip end 109 radially extending from an outer surface of the receptacle 106 such that the tip end 109 is formed with a L-shape and configured to couple with the mating block 200. Accordingly, the adapter body 100 is securely engaged with the mating block 200 due to the retention feature of the annular lip 110.

In FIGS. 2 and 2A, the outlet 104 has a first end 103 and a second end 105 extending from the first end 103 along the longitudinal axis X. Further, the adapter body 100 includes an adapter bead 114 radially formed around the first end 103 of the outlet 104. The adapter bead 114 includes a protrusion 116 projecting from a second surface 115 of the adapter bead 114 in a direction of the receptacle 106 along the longitudinal axis X and being laterally spaced from the passage bore 102. As shown in FIG. 1, the second surface 115 of the adapter bead 114 is coupled to the first surface 204 of the mating block 200 such that the adapter body 100 is securely retained with the mating block 200.

While one of the apertures 104 has been labelled as 'outlet', the skilled artisan will recognize that the aperture could be considered to be 'inlet'. That is, a tube connected to the outlet 104 may deliver fluid to the connection arrangement device 10, whereby the fluid flows through the passage bore 102 to the receptacle 106 and any tube connected thereto. Likewise, a tube connected to the receptacle 106 may deliver fluid to the connection arrangement device 10, whereby the fluid flows through the passage bore 102 to the outlet 104 and any tube connected thereto. Since the arrangement device 10 is flexible and adaptable in this manner, the aperture 104 will be referred to herein an outlet for simplicity, but may also be considered to be an inlet based on the chosen arrangement.

The adapter body 100 is formed of polymer materials such as polyamide (PA), for example polyamide 612 (PA 612), PA 6, PA 12, etc., PPA, and PPS. Also, to increase the strength and/or mechanical stability, the plastic material can be provided with fiber reinforcement such as glass fibers such that the adapter body 100 is formed with a pressure-resistant plastic material. Further, it is also possible to have a resin-based plastic material. The resin-based plastic materials result in hard, glass-like components, which are firmly three-dimensionally cross-linked via chemical bonds. This type of materials have a high thermomechanical strength in conjunction with a low density.

In addition, as shown in FIG. 1A, the tube 12 combined with the adapter body 100 in the connection arrangement device 10 is also made from a plastic material, which is selected from the similar materials of the adapter body 100, for example polyamide (PA). Further, the adapter body 100 of the connection arrangement device 10 is usually combined with multilayer tubes with outer (or inner) layer of materials, which are compatible with regard to welding (e.g., laser welding or spin welding). However, even though the polyamide (PA) is used for the adapter body 100, and the tube, each of the polyamide (PA) materials used in both parts might be different. In the fluid line system, the tube can be a single or multilayer tube, which is generally made of Polyamide (PA 6, PA 12, PA 612, semi-aromatic polyamide (PA 9T), HDPE, PP, etc.), which is weldable with the adaptor body. However, the adaptor body is generally made of PA12 (with max 30% glass fiber reinforcements), PPA (Polyphthalamide) or PP (Polypropylene). This results in comparable mechanical and chemical properties.

Figure 3:
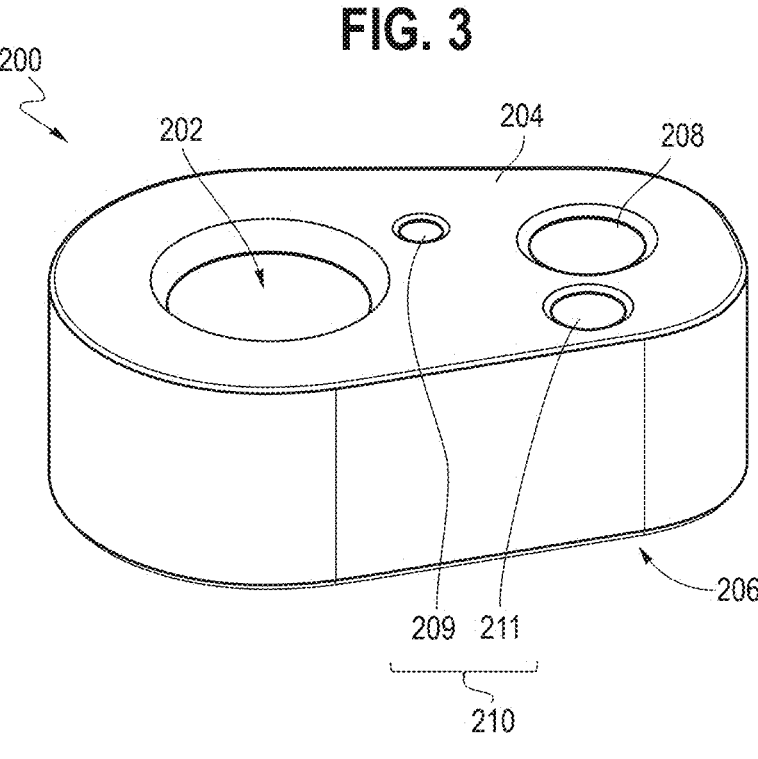
FIG. 3 shows a perspective view of the mating block of the connection arrangement device of FIG. 1.
Figure 3A:
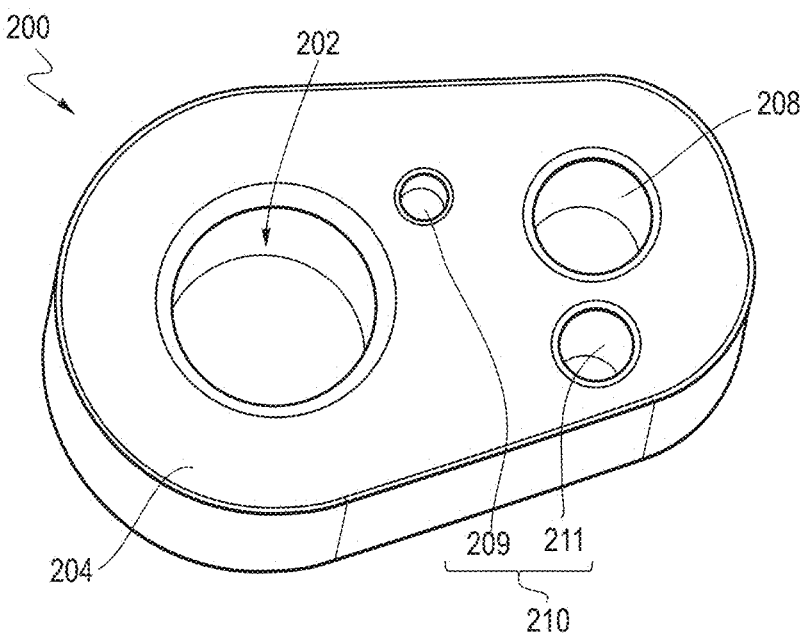
FIG. 3A shows a top view of the mating block of FIG. 3.

FIGS. 3 and 3A show the mating block 200 having at least one hole formed as a longitudinal channel 202 along the longitudinal axis X to receive and couple with the adapter body 100. For example, FIGS. 3 and 3A show the mating block 200 having one longitudinal channel 202 formed with a circular shape, but in another approach, the mating block 200 can have more than one longitudinal channel. The longitudinal channel 202 is preferably formed as a through hole or bore as shown in FIG. 3A, and extends from a first surface 204 to a second surface 206 of the mating block 200.

In FIGS. 3 and 3A, the mating block 200 further includes at least one through hole 208 for mounting and fixing to the fluid line system by a fastening element (not shown) such as a screw. Further, the mating block 200 is made of a metallic material such as an aluminum or a polymeric material (e.g., a glass fiber reinforced material). In particular, the material of the mating block 200 is rigid and has a high stress capacity such that the material of the mating block 200 inhibits plastic deformation by limiting creep caused by the joint assembly torque. The through hole 208 is laterally spaced from the longitudinal channel 202 and the adapter body 100 coupled to the mating block 200 (see FIG. 1), i.e. relative to the longitudinal axis X. In addition, the mating block 200 includes at least one blind hole 210. In FIGS. 3 and 3A, for example, the mating block 200 has a first blind hole 209 and a second blind hole 211, which are formed on the first surface 204. The first blind hole 209 is located next to the longitudinal channel 202 to receive the protrusion 116 of the adapter body 100 and the second blind hole 211 is located next to the through hole 208 to receive a locator pin 16 (see FIG. 1).

Figure 4:
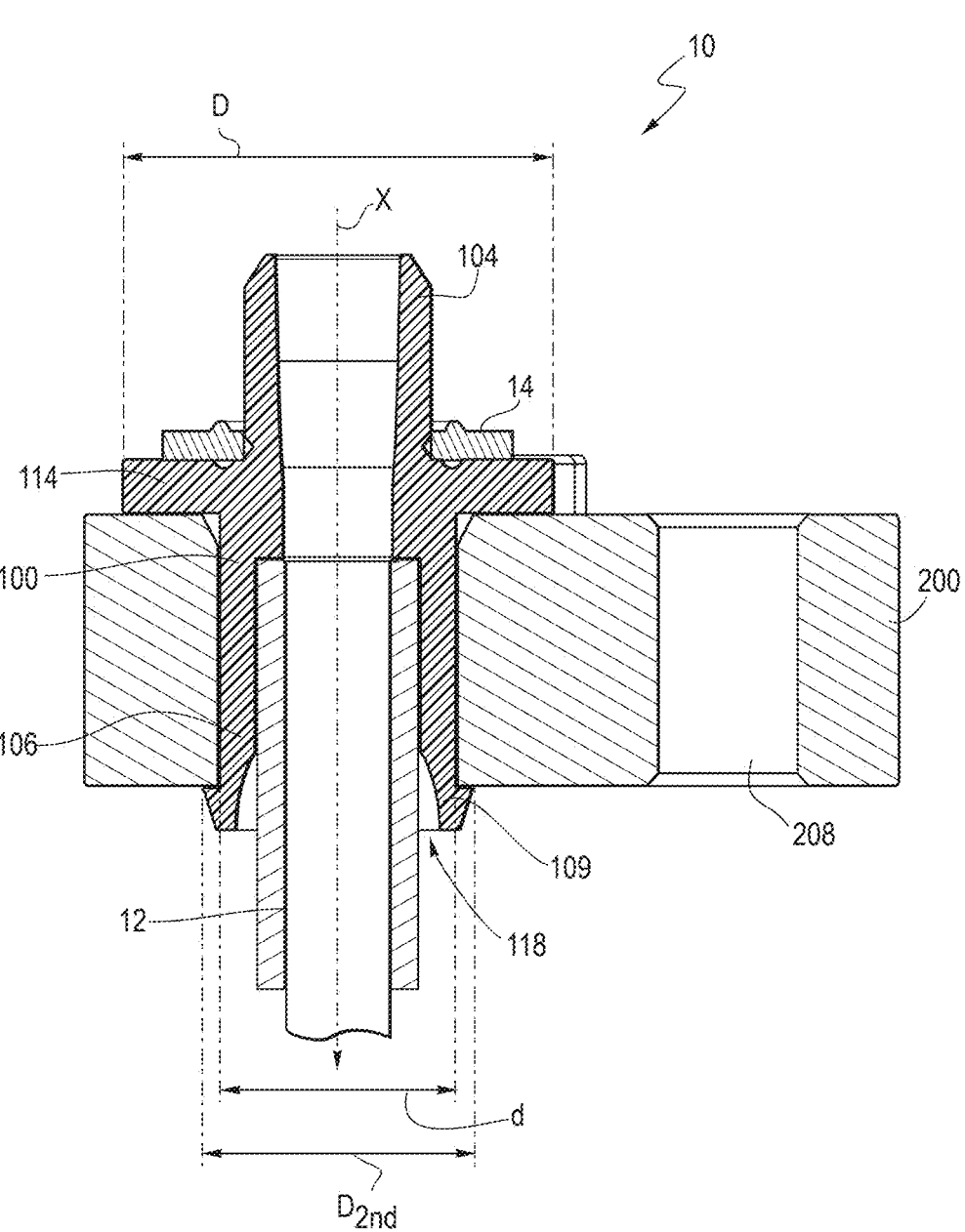
FIG. 4 shows a side sectional view of the connection arrangement device, taken along line A-A in FIG. 1.

FIG. 4 shows a cross-sectional view of the connection arrangement device 10 having the adapter body 100 and the mating block 200. The adapter body 100 includes the outlet 104 and the receptacle 106, which are formed in a straight-flow direction. In accordance with other forms of the present disclosure, the outlet 104 and the receptacle 106 may be angled to create a desired flow direction such as 45 degrees or 90 degrees (i.e., an angled direction). Further, as shown in FIG. 4, the adapter body 100 is securely engaged with the mating block 200 due to the retention feature of the annular lip 110 formed in the receptacle 106. The annular lip 110 is operable between a locked position (shown in FIG. 4) and an unlocked position such as a collet-type design. In the unlocked position, the annular lip 110 has a first diameter that is sized to pass through the longitudinal channel 202 of the mating block 200 and in the locked position, the annular lip 110 has a second diameter $D_{2nd}$ that is greater than a diameter d of the longitudinal channel 202 of the mating block. Further, the retention feature of the annular lip 110 allows the mating block 200 to have the simple hole (i.e., the longitudinal channel 202) to receive the adapter body 100 such that the mating block 200 does not need to be formed with additional features or cutouts to securely couple with the adapter body 100. In addition, due to the adapter body 100 having the annular lip retention feature, the mating block 200 having the simple hole coupled with the adapter body 100 is adapted to fully support the sealing of the adapter body 100 when the connection arrangement device 10 is mounted to a fluid line system such that it also reduces creep of the adapter body 100 caused by assembly torque.

In FIG. 4, further, the adapter bead 114 has a diameter D, which is greater than the diameter d of the longitudinal channel 202 of the mating block 200 such that the adapter body 100 is securely coupled to the mating block 200. Further, the annular lip 110 of the adapter body 100 is formed with a pocket 118 used for a bonding such as a laser welding, a spin welding, etc. between the adapter body 100 and the tube 12 when the tube 12 is inserted into the receptacle 106. For example, in FIG. 4, the pocket 118 formed in the inner portion of the annular lip 110 around the inserted tube 12 has a space for the welding such that the annular lip 110 formed with the pocket 118 can save a packaging space of the connection arrangement device 10. As shown in FIG. 4, due to the adapter bead 114 and the retention feature of the annular lip 110, the adapter body 100 is vertically and/or longitudinally restrained such that it cannot move longitudinally (i.e., along the longitudinal axis X) relative to the mating block 200. Further, as shown in FIGS. 2A and 3A, the first surface 204 of the mating block 200 has the first blind hole 209 receiving the protrusion 116 projecting from the second surface 115 of the adapter bead 100 along the longitudinal axis X such that the adapter body 100 is also rotationally restrained relative to the mating block 200 when the adapter body 100 is securely coupled to the mating block 200.

As shown in FIG. 4, the tube 12 is inserted into the receptacle 106 of the adapter body 100 to be connected by a firmly bonded manner, in particular by a laser welding, a spin welding, and other adhesive materials. The adapter body 100 having the inserted tube 12 is coupled with the longitudinal channel 202 of the mating block 200 such that, due to the retention feature of the annular lip 110, both act as a single unit and they are not separated or rotated from each other. Further, the coupled adapter body 100 and the mating block 200 improve mechanical stability and also weight reduction of the connection arrangement device 10 when mounted to a fluid line system, which is operated in the vehicle.

Further, as shown in FIGS. 1 and 4, a sealing ring 14 retained around the first end 103 of the outlet 104 is placed on a first surface 113 of the adapter bead 114. The sealing ring 14 is compressed and configured to seal a leakage of the connection when the connection arrangement device 10 is securely mounted to one of the fluid line system components (not shown). The pressure onto the sealing ring 14 is sufficient for sealing when the mating block 200 is tightly screwed with the fluid line system component. Namely, when an axial force (e.g., downward on the page in FIG. 4) is placed upon the sealing ring 14 is placed upon the sealing ring 14, the sealing ring 14 will compress vertically and expand radially (due to the elastic nature of the material of the sealing ring) thereby forming a seal with the tube or component that is pressed onto the sealing ring 14 and the outlet 104. In addition, as shown in FIG. 1, the locator pin 16 is placed inside the second blind hole 211 of the mating block 200 allows the connection arrangement device 10 to be easily and correctly connected with other components when it is mounted to the fluid line system or assembled to other mating blocks.

The connection arrangement device 10 of the present disclosure is suitable for various fluid line systems such as an air conditioning system or a cooling system in motor vehicles. For example, the connection arrangement device 10 is suitable for cooling systems of hybrid or electric vehicles having cooling/tempering electronic components such as batteries and also air conditioning systems. Further, the fluid line systems used in the vehicles should be lightweight as much as possible, but the fluid line systems are also provided with stable connections among the components because of the vibrations and shocks while the vehicles are operated. Accordingly, the connection arrangement device 10 of the present disclosure make it possible to produce a stable and durable connection with a light weight.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A connection arrangement device for making a secure connection with at least one tube in a fluid line, the connection arrangement device comprising:
   at least one adapter body having a passage bore forming at least one fluid channel with at least one outlet and a receptacle; and
   a mating block formed with at least one longitudinal channel receiving the at least one adapter body,
   wherein the at least one adapter body includes a retention feature formed in the receptacle and coupled to the mating block such that the at least one adapter body is securely retained in the mating block, and
   wherein at least one tube or hose is inserted into the receptacle of the adapter body and connected to the adapter body in a firmly bonded manner.

2. The connection arrangement device of claim 1, wherein the retention feature of the adapter body is formed with an annular lip at an end portion of the receptacle such that the annular lip is coupled with a second surface of the mating block.

3. The connection arrangement device of claim 2, wherein the annular lip is formed with cut-outs to provide radial flexibility to the end portion of the receptacle to be securely held into the mating block.

4. The connection arrangement device of claim 3, wherein the annular lip is operable between a locked position and an unlocked position, the annular lip having a first diameter in the unlocked position that is sized to pass through the longitudinal channel of the mating block, the annular lip having a second diameter in the locked position that is greater than a diameter of the longitudinal channel of the mating block.

5. The connection arrangement device of claim 2, wherein the annular lip having a tip end radially extending from an outer surface of the receptacle such that the tip end is formed with a L-shape and configured to couple with the mating block.

6. The connection arrangement device of claim 2, wherein the annular lip of the receptacle is formed with a pocket around the tube used for a bonding between the tube and the adapter body when the tube is inserted into the receptacle of the adapter body.

7. The connection arrangement device of claim 1, wherein the adapter body includes an adapter bead outwardly and radially formed around a first end of the outlet such that the adapter bead is coupled with a first surface of the mating block.

8. The connection arrangement device of claim 7, wherein the first surface is an exterior surface of the mating block.

9. The connection arrangement device of claim 7, wherein a sealing ring is placed around the outlet of the adapter body and on a side of the adapter bead that is opposite the first surface and mating block, the sealing ring configured for sealing in the fluid line when the outlet is connected with the tube or attached to a fluid line system component.

10. The connection arrangement device of claim 1, wherein the mating block is formed of a metallic material and the adapter body is formed of a polymeric material.

11. A method of a connection arrangement with at least one tube for making a secure connection in a fluid line, the method comprising the steps of:
   providing a mating block having at least one longitudinal channel extending between exterior sides of the mating block, the exterior sides defining first and second surfaces;
   providing at least one adapter body having a receptacle and an outlet, the adapter body having a retention feature formed in an end portion of the receptacle, the retention feature including an annular lip at the end portion of the receptacle, the adapter body further having and adapter bead outwardly and radially formed around the outlet;
   coupling the adapter body to the at least one longitudinal channel of the mating block such that the retention feature of the adapter body is securely coupled to the second surface of the mating block and the adapter bead is coupled with the first surface of the mating block, whereby the adapter body is securely engaged with the mating block; and
   inserting an end of the tube into the receptacle of the adapter body and connecting the inserted tube with the adapter body in a firmly bonded manner.

12. The method of claim 11, wherein the annular lip is formed with cut-outs to provide radial flexibility to the end portion of the receptacle to be securely held into the mating block.

13. The method of claim 11, further comprising the step of installing a sealing ring in an outlet formed in the adapter body by an interference-fit to connect with another tube.

14. The method of claim 11, further comprising the step of mounting the mating block engaged with the adapter body in the fluid line by a fastening element via a through hole of the mating block.

* * * * *